(12) United States Patent
Manjunath et al.

(10) Patent No.: US 11,855,816 B2
(45) Date of Patent: Dec. 26, 2023

(54) SIGNAL TRANSMISSION SYSTEM FOR USE WITH EYE DIAGRAM MONITOR

(71) Applicant: Texas Instruments Incorporated, Dallas, TX (US)

(72) Inventors: Rakesh Manjunath, Bangalore (IN); Aravind Ganesan, Bangalore (IN); Ani Xavier, Bengaluru (IN); Jagannathan Venkataraman, Bengaluru (IN); Abhishek Agrawal, Ghaziabad (IN); Charls Babu, Irinjalakuda (IN); Aditya Kumar, Jamshedpur (IN)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 17/567,775

(22) Filed: Jan. 3, 2022

(65) Prior Publication Data
US 2023/0054834 A1    Feb. 23, 2023

(30) Foreign Application Priority Data
Aug. 23, 2021 (IN) .............................. 202141037986

(51) Int. Cl.
*H04L 27/01* (2006.01)
*H04L 27/20* (2006.01)

(52) U.S. Cl.
CPC .............. *H04L 27/01* (2013.01); *H04L 27/20* (2013.01)

(58) Field of Classification Search
CPC ................................ H07L 27/01; H04L 27/20
See application file for complete search history.

(56) References Cited

U.S. PATENT DOCUMENTS

| | | | |
|---|---|---|---|
| 9,705,708 B1* | 7/2017 | Jin | H04L 25/03885 |
| 10,305,704 B1* | 5/2019 | Kenyon | H04L 25/03057 |
| 10,785,072 B2* | 9/2020 | Hormati | H04L 7/0087 |
| 10,992,501 B1* | 4/2021 | Sun | H03L 7/081 |
| 2016/0352557 A1* | 12/2016 | Liao | H04L 25/03057 |

* cited by examiner

*Primary Examiner* — Dac V Ha
(74) *Attorney, Agent, or Firm* — Valerie M. Davis; Frank D. Cimino (57) ABSTRACT

A signal transmission system includes an equalization filter configured to filter an input signal based at least in part on a feedback signal, a slicer configured to generate data based on the filtered input signal at a plurality of different phases, a synchronizer configured to compute a phase delay between the input signal at each of the different phases and the data, and a pattern generator configured to generate the feedback signal at a phase adjusted by the phase delay.

14 Claims, 8 Drawing Sheets

SIGNAL TRANSMISSION SYSTEM FOR USE WITH EYE DIAGRAM MONITOR

CROSS-REFERENCE TO RELATED APPLICATION

This application claims the benefit under 35 U.S.C. § 119(a) of India Provisional Patent Application No. 202141037986, filed Aug. 23, 2021, and entitled "EYE DIAGRAM MONITOR FOR A SAMPLED SYSTEM," which is incorporated by reference herein in its entirety.

FIELD OF THE DISCLOSURE

This disclosure relates to signal processing and conditioning, and more particularly, to signal transmission systems for use with eye diagram monitors.

BACKGROUND

A signal transmission system transmits a digital signal from a source to a destination over a physical medium (such as a cable, like a copper cable or a fiber optic cable, or through the air, like wireless communications of Wi-Fi®). Ideally, the signal transmission system delivers the signal to the destination without any errors; that is, the destination receives exactly the same signal that was transmitted by the source. In practice, the signal transmission system (including the physical medium) may introduce some error into the signal from effects such as noise, signal dispersion, and distortion. Thus, it is desirable to test or otherwise evaluate the signal transmission system to determine the error rate. For example, the presence of an error can be determined by comparing the received signal to the original transmitted signal. Such a comparison provides an estimate of the error rate but does not convey additional detailed information that can potentially be used to further evaluate how the signal transmission system is performing or to identify the sources of the error. Additional tools, such as eye diagram monitors, can also be used to detect errors in the signal transmission system. However, in some cases there is observational (systematic) error and/or other errors induced by the use of such tools. Therefore, further signal transmission system analysis techniques are needed to address these and other shortcomings.

SUMMARY

Signal transmission systems for use with eye diagram monitors are provided herein. The techniques can be embodied, for example, in a controller or an integrated circuit (e.g., a semiconductor die).

One example is a signal transmission system with a retimer with a data path including: an equalization filter configured to filter an input signal based at least in part on a feedback signal; a slicer configured to compare the filtered signal sampled at a plurality of different phases with a threshold voltage (e.g., $-V_{max}$ to $+V_{max}$) and to generate a binary output per unit sample; a synchronizer configured to compute a phase delay between the input signal at each of the different phases and the binary output for each of the unit samples; and a pattern generator configured to generate the feedback signal at a phase adjusted by the phase delay. The retimer can include an eye diagram monitor for debugging, testing, troubleshooting, or otherwise monitoring the data path in the system.

Another example is a signal transmission circuit including: an equalization circuit configured to filter an input signal based at least in part on a feedback signal; a slicer circuit configured to generate data based on the filtered input signal sampled at a plurality of different phases, a synchronizer circuit configured to compute a phase delay between the input signal at each of the different phases and the data; and a pattern generator circuit configured to generate the feedback signal at a phase adjusted by the phase delay, the input signal and the feedback signal each representing a data test pattern.

Another example is a method for transmitting a signal. The method includes filtering an input signal based at least in part on a feedback signal, sampling the filtered input signal at a plurality of different phases, generating data based on the sampled input signal, computing a phase delay between the input signal and the data at each of the different phases, and generating the feedback signal at a phase adjusted by the phase delay.

BRIEF DESCRIPTION OF THE DRAWINGS

The same reference numbers or other reference designators are used in the drawings to designate the same or similar (functionally and/or structurally) features.

DETAILED DESCRIPTION

Signal transmission systems for use with eye diagram monitors are provided herein.

Although the techniques can be used in any number of applications, they are particularly well-suited for analyzing signals transmitted on high-speed serial links via one or more retimers (a type of signal retransmission circuit), according to some embodiments. Examples of such applications include Ethernet networks operating in the range of approximately 200 gigabits per second (200G) to 400 gigabits per second (400G), or higher, and 5G broadband cellular base stations using four-level pulse-amplitude modulation (e.g., PAM4 multilevel signaling) or other modulation techniques suitable for data transmission rates exceeding approximately 200G with relatively low bit error rates. As explained in further detail below, an eye diagram monitor is a diagnostic tool, such as an oscilloscope, for visualizing a periodic signal at several different phases. The eye diagram monitor measures the signal by incrementally moving the signal sampling point away from an ideal sampling phase, such as the average or midpoint of a clock cycle. However, moving the signal sampling point introduces error in the output due to destructive second order effects and signal transmission delays caused by a decision-feedback equalizer (DFE) moving the sampling point of the retimer circuit. These errors cause the eye diagram monitor to inaccurately reflect system performance. To this end, according to at least some examples, the error is reduced by synchronizing an internally generated feedback signal to the input signal. Furthermore, a known data test pattern is used for both the input signal and the feedback signal generated by the synchronization logic, which enables an internally generated pattern synchronized with input pattern and further reduction in the error.

General Overview

As previously noted above, there remain a number of non-trivial issues associated with signal transmission system analysis techniques. Ethernet networks operating in the range of approximately 200 gigabits per second (200G) to 400 gigabits per second (400G) or higher and 5G broadband cellular base stations use high-speed serial links to support ultra-high bandwidth data transmission. Thus, it is desirable to analyze the signal quality of such high bandwidth systems in the digital domain to determine the error rate of the signal transmission system from end-to-end and/or at intermediate points. For instance, an eye diagram monitor is a device used to a visualize of the probability that a given portion of the signal is received in error. The visualization, also referred to as an eye diagram, represents a probability density function of the signal in the digital domain.

Figure 1:
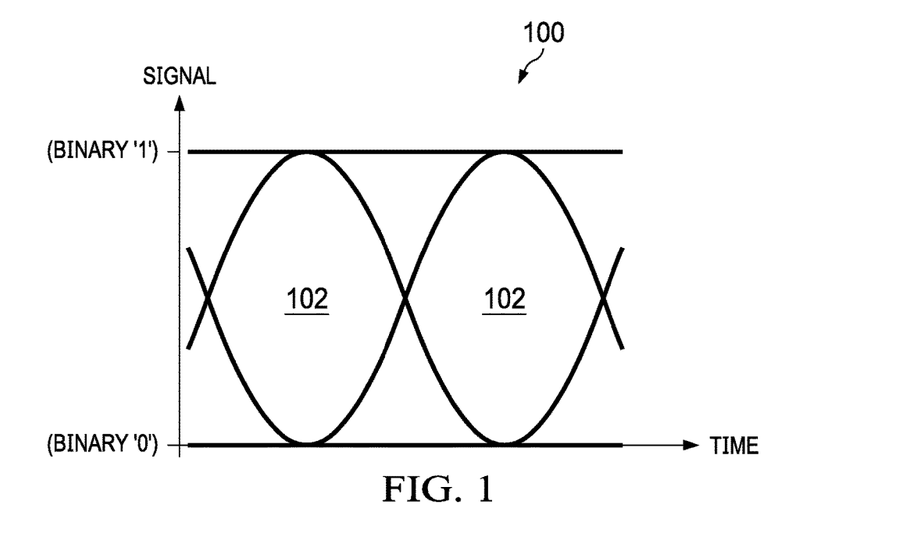
FIG. 1 is an example of an eye diagram for use with two-level pulse-amplitude modulation (e.g., PAM2 multi-level signaling) and non-return-to-zero modulation.

FIG. 1 is an example of an eye diagram 100. The eye diagram 100 is a two-dimensional plot of a sampled input signal (e.g., amplitude) as a function of time (e.g., phase), such as displayed by an oscilloscope or other signal analyzer. The eye diagram 100 represents a graphical pattern resembling a series of eyes 102, or openings, in the plotted waveform of the sampled input signal. Wider eyes, for instance, represent signals with relatively low noise or distortion. Eye diagrams can thus be used to analyze the performance or error rate of the signal transmission system by, for example, identifying the source and effects of signal noise and distortion (such as amplitude and phase distortion) in the signal transmission system.

Eye diagram monitors are useful in a number of applications, such as for evaluating high-speed serial data links including detecting signal lock. However, as noted above, errors introduced by moving the signal sampling point can lead to inaccurate eye diagrams. Furthermore, certain data encoding protocols used for high-speed data serial links sacrifice the signal-to-noise ratio (SNR) in favor of increased data rates. Therefore, such protocols potentially introduce additional error into the signal. In such cases, the signal transmission system must compensate for the error so as not to cause an erroneous eye diagram. Accordingly, there remain a number of non-trivial issues associated with analysis of signal transmission systems.

Signal Transmission System

Figure 2:
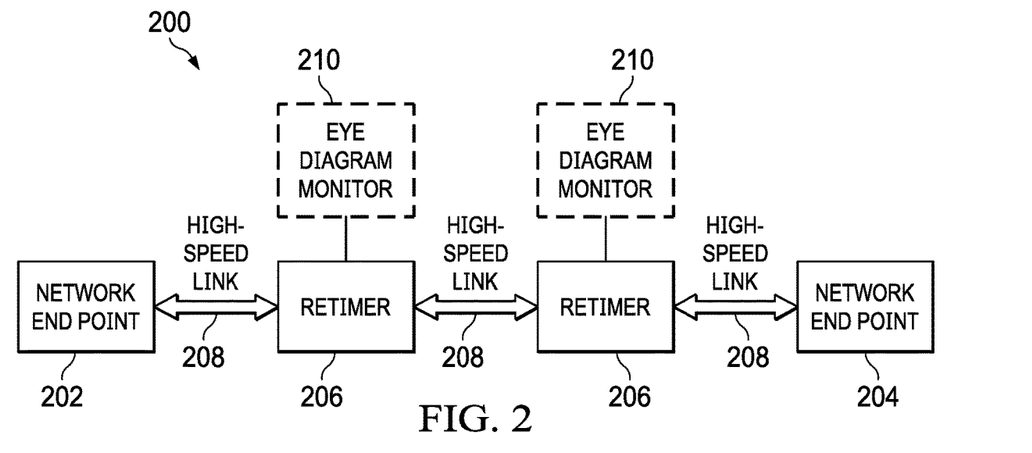
FIG. 2 is a block diagram of an example signal transmission system that can be used with an eye diagram monitor, in accordance with an embodiment of the present disclosure.

FIG. 2 is a block diagram of an example signal transmission system 200, in accordance with an embodiment of the present disclosure. The system 200 includes a first endpoint 202, a second endpoint 204, at least one retimer 206, and high-speed serial links 208 between the first and second endpoints 202, 204 via the retimer(s) 206.

As noted above, in some examples, 200G/400G Ethernet networks and 5G base stations can use the high-speed serial links 208 to connect the first and second endpoints 202, 204 together. In some examples, the high-speed serial links 208 provide one or more serializer/de-serializer (SerDes) lanes for transmitting data between the first and second endpoints 202, 204. Each SerDes lane operates at greater than approximately 56 gigabytes per second using four-level pulse-amplitude modulation (e.g., PAM4 multilevel signaling). PAM4 combines two bits of data into a single symbol with four amplitude levels, which effectively doubles the data rate relative to networks operating at 100 gigabits per second (100G). However, PAM4 imposes a penalty on SNR (e.g., by about 9 decibels), which reduces the physical transmission distance of the viable signal. To increase the transmission distance between the first and second endpoints 202, 204, the retimer(s) 206 condition the signal along the high-speed link 208 by extracting a clock embedded in the signal, recovering the data from the signal, and retransmitting a fresh copy of the data using a new clock on to the next retimer 206 or the first or second (destination) endpoint 202, 204.

Figure 3:
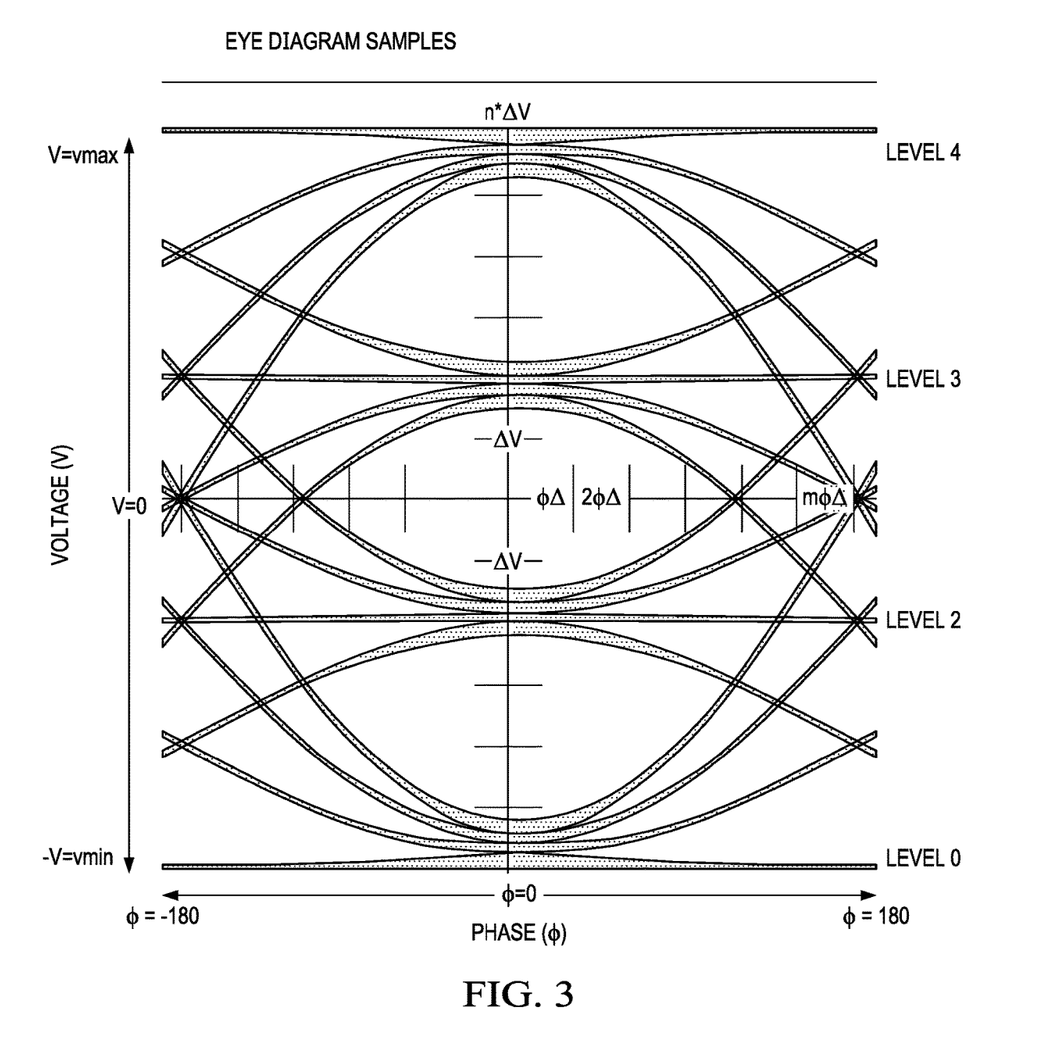
FIG. 3 is another example of an eye diagram for use with four-level pulse-amplitude modulation (e.g., PAM4 multi-level signaling), with signal jitter plotted along the horizontal axis and signal amplitude noise plotted along the vertical axis.

In some examples, an eye diagram monitor 210 is a diagnostic tool configured to obtain signal eye statistics from the system 200, for example, by measuring the signal at one or more of the retimers 206. The eye diagram monitor 210 generates an eye diagram with phase (signal jitter) plotted along the horizontal axis and voltage (signal amplitude noise) plotted along the vertical axis, such as shown in FIG. 3. FIG. 3 shows an example diagram for a PAM4 encoded signal, with each of the four PAM voltage amplitude levels (between +Vmax and −Vmax) labeled along a voltage (vertical) axis and the signal phase plotted along a phase (horizontal) axis. Instead of a 0 and 1 level as in NRZ, PAM4 has four amplitude levels (0, 1, 2, and 3). This signaling method transmits two bits of data for every symbol. As a result, PAM4 transmits twice as much data per unit time. Level 0 is a measure of the mean value of the logical 0 of an eye diagram; Level 1 is a measure of the mean value of the logical 1 of an eye diagram; Level 2 is a measure of the mean value of the logical 2 of a PAM4 eye diagram; and Level 3 is a measure of the mean value of the logical 3 of a PAM4 eye diagram. The eye diagram monitor (e.g., oscilloscope) produces three eyes, which are the open regions between the plotted points along the voltage and phase dimensions. In general, the wider the eyes, the less noise is present in the signal. Thus, the eye diagram can be used for troubleshooting in the field or during circuit board design to obtain qualitative statistics with respect to the jitter and the amplitude noise. In some examples, eye diagrams are generated at one or more of the retimers 206 along the high-speed data links 208 to assist with locating problematic regions of the signal transmission system 200 where error is introduced.

Retimer

Figure 4:
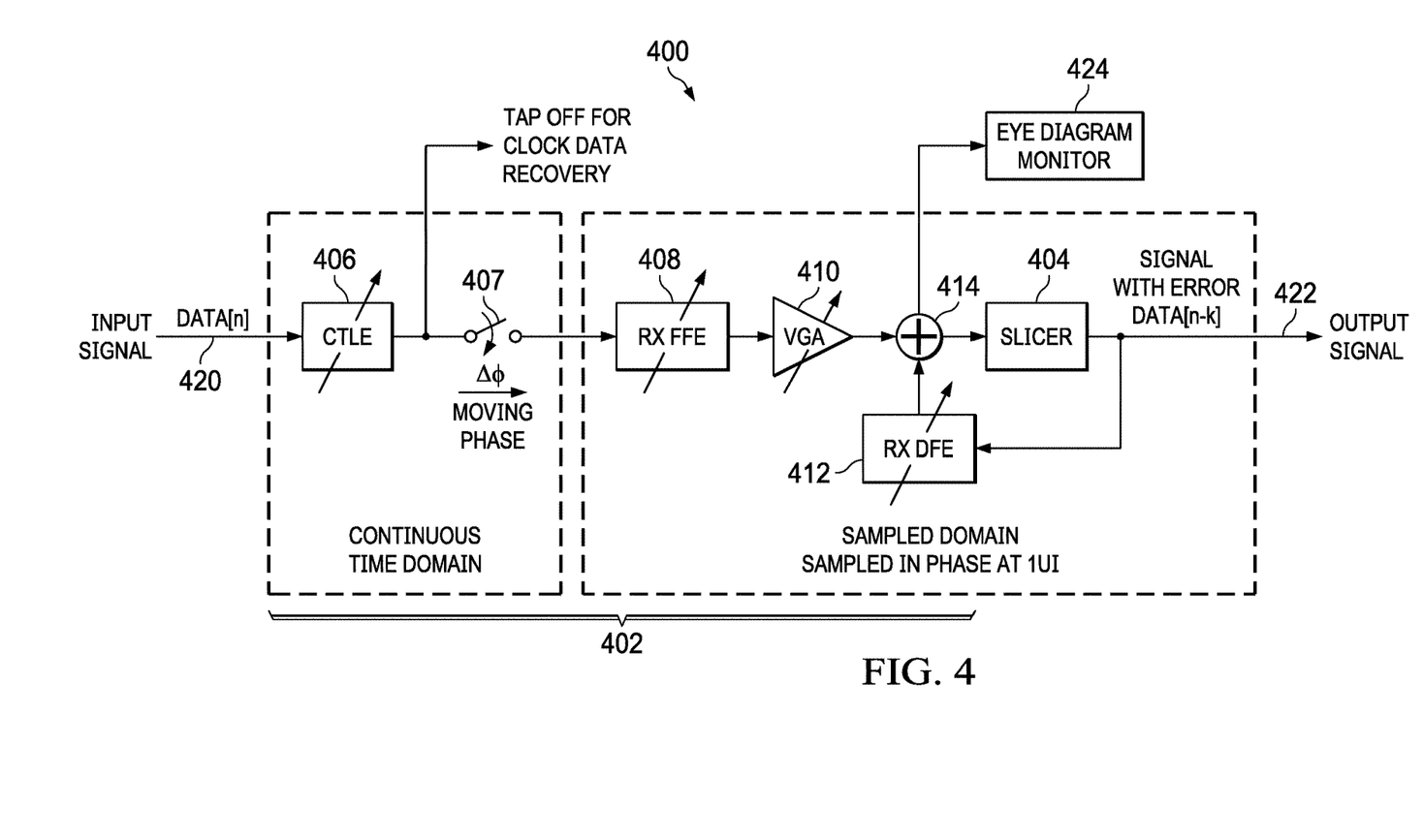
FIG. 4 is a block diagram of an example retimer, in accordance with an embodiment of the present disclosure.

FIG. 4 is a block diagram of an example retimer 400, in accordance with an embodiment of the present disclosure. The retimer 400 is one example implementation of retimer 206 (FIG. 2). The retimer 400 conditions an input signal 420 for retransmission as an output signal 422 by extracting a clock signal embedded in the input signal 420, recovering data from the input signal 420, and retransmitting a copy of the data using a new clock signal to another retimer or endpoint of the signal transmission system 200. The retimer 400 includes an analog continuous time domain equalization filter 402 with a low bit error rate (e.g., a BER of about $10^{-12}$) and a slicer 404. The filter 402 includes a continuous time linear equalizer (CTLE) 406, a sampling switch 407, a receiver feed-forward equalizer (Rx FFE) 408, a variable gain amplifier (VGA) 410, a receiver decision-feedback equalizer (Rx DFE) 412, and a summer 414. The retimer 400, including the analog continuous time domain equalization filter 402 and the slicer 404, can be implemented in hardware and on the same chip.

In high-speed serial interfaces, such as shown in FIG. 2, inter-symbol interference (ISI) may occur due to bandwidth limitations. The filter 402 components of the retimer 400, in combination, compensate for the ISI by comparing high- and low-frequency components of data power and generating feedback signals until the power spectrum is balanced. In other words, the filter 402 is a frequency shaping filter that flattens the channel response up to a given frequency, which improves BER and increases the eye opening in the eye diagram. For example, the CTLE 406 can include an amplifier configured to provide more amplification at a given operating frequency (or a given operating frequency band) and less amplification for signals with a frequency outside of the operating frequency/operating frequency band. The Rx FFE 408, the VGA 410, and the Rx DFE 412 are used in conjunction with each other to further equalize the channel and to recover the data with fewer errors than possible without equalization. For instance, the Rx DFE 412 recovers noise-less data and subtracts the data from the signal to remove at least some residual post-cursor ISI (interference caused by downstream data bits), while the CTLE 406 and the Rx FFE 408 remove at least some pre-cursor ISI (interference caused by upstream data bits).

The output of the CTLE 406 is sampled prior to the Rx FFE 408 by closing the sampling switch 407 at each rising or falling edge of the clock signal recovered from the input signal 420. For example, the clock signal can be embedded with the data in the input signal 420 (such as a self-clocking signal, where binary state changes in the data occur at clocked intervals) or the clock signal can be recovered from a clock signal input provided separately from the input signal 420. In this configuration, the slicer 404 compares the sampled input signal 420 after equalization by the CTLE 406, the Rx FFE 408, and the VGA 410 with a threshold voltage (e.g., $-V_{max}$ or $+V_{max}$ based on the signal transmission protocol, such as a threshold of +1.2 volts or −1.2 volts or as otherwise prescribed by the signal transmission specification). Based on the comparison, the slicer 404 generates a binary output corresponding to data encoded in the input signal 420 at the sampled phase. If the input signal 420 is above the threshold, the slicer output 422 is a binary "1" (or "0"), and if the input signal 420 is below the threshold, the slicer output 422 is a binary "0" (or "1"). If the retimer 400 introduces no error to the signal, then the data in the output signal 422 will be the same as the data in the input signal 420.

However, as noted above, the signal transmission system (including the physical medium) may introduce some error into the signal from effects such as noise, signal dispersion, and distortion. To detect such error, an eye diagram monitor 424, such as an oscilloscope, can be used to quantify the error, such as during design, testing, troubleshooting, or otherwise diagnosing system performance. The eye diagram monitor 424 taps the sampled input signal 420 after equalization (between the CTLE 406 and the Rx FFE 408) for building an eye diagram. The eye diagram monitor 424 samples the signal at a time where the signal out of the CTLE 406 is centered (or nearly centered). The eye diagram monitor 424 further builds the eye diagram by sweeping along two dimensions: voltage and phase. To sweep along one of the dimensions, the eye diagram monitor 424 moves the sampling point (e.g., the trigger of the time base or "sweep" of the oscilloscope) away from an ideal phase (e.g., $\Phi=0$ or an average or midpoint of the clock cycle). For example, the eye diagram monitor 424 samples the signal in phase for one unit interval (UI), with each phase step being $\Delta\Phi$ away from the ideal phase of $\Phi=0$, and also samples the signal in voltage, with each voltage step being $\Delta V$.

As noted above, moving the sampling point away from the ideal phase potentially introduces error in the slicer (binary) output 422 due to destructive second order effects and signal transmission delays. For instance, PAM4 can be used to increase the data rate of the signal transmission system but imposes a penalty on SNR. To reduce the bit error rate caused by the PAM4 SNR penalty, the Rx DFE 412 is included in a feedback loop that feeds the sampled data 422 output from the slicer 404 back into the continuous time domain equalization filter 402. However, the Rx DFE 412 introduces, into the feedback signal, slicer settling errors caused by moving the sampling point away from the ideal phase and burst errors. The settling error occurs in response to an instantaneous step input and before the slicer enters and remains within a given error band. Any errors introduced into the equalization filter 402, such as the slicer settling errors, cause the eye diagram monitor to inaccurately reflect system performance. Furthermore, the retimer 400 may introduce latency into the signal as a result of the physical distance on the silicon between the CTLE 406 and the slicer 404 and between the slicer 404 and the Rx DFE 412. For instance, if the input signal 420 includes Data[n], where [n] is an index to a sampled symbol or other unit of data encoded in the input signal 420, then the output signal 422 may include Data[n−k], where [k] represents a latency between the input to the CTLE 406 and the output of the slicer 404. Thus, due to the compounded errors introduced by the retimer 400 discussed above, building an eye diagram monitor for a sampled PAM4 system with a feedback loop is more complex than for continuous time or non-return-to-zero (NRZ) modulation systems that do not include such a feedback loop.

To this end, and in accordance with various examples, the signal transmission system, and in particular the retimer(s), can be modified to compensate for the feedback errors discussed above such that the eye diagram more accurately represents the signal transmitted through the signal transmission system.

Retimer with Alternate Data Path for Eye Diagram Monitor

Figure 5:
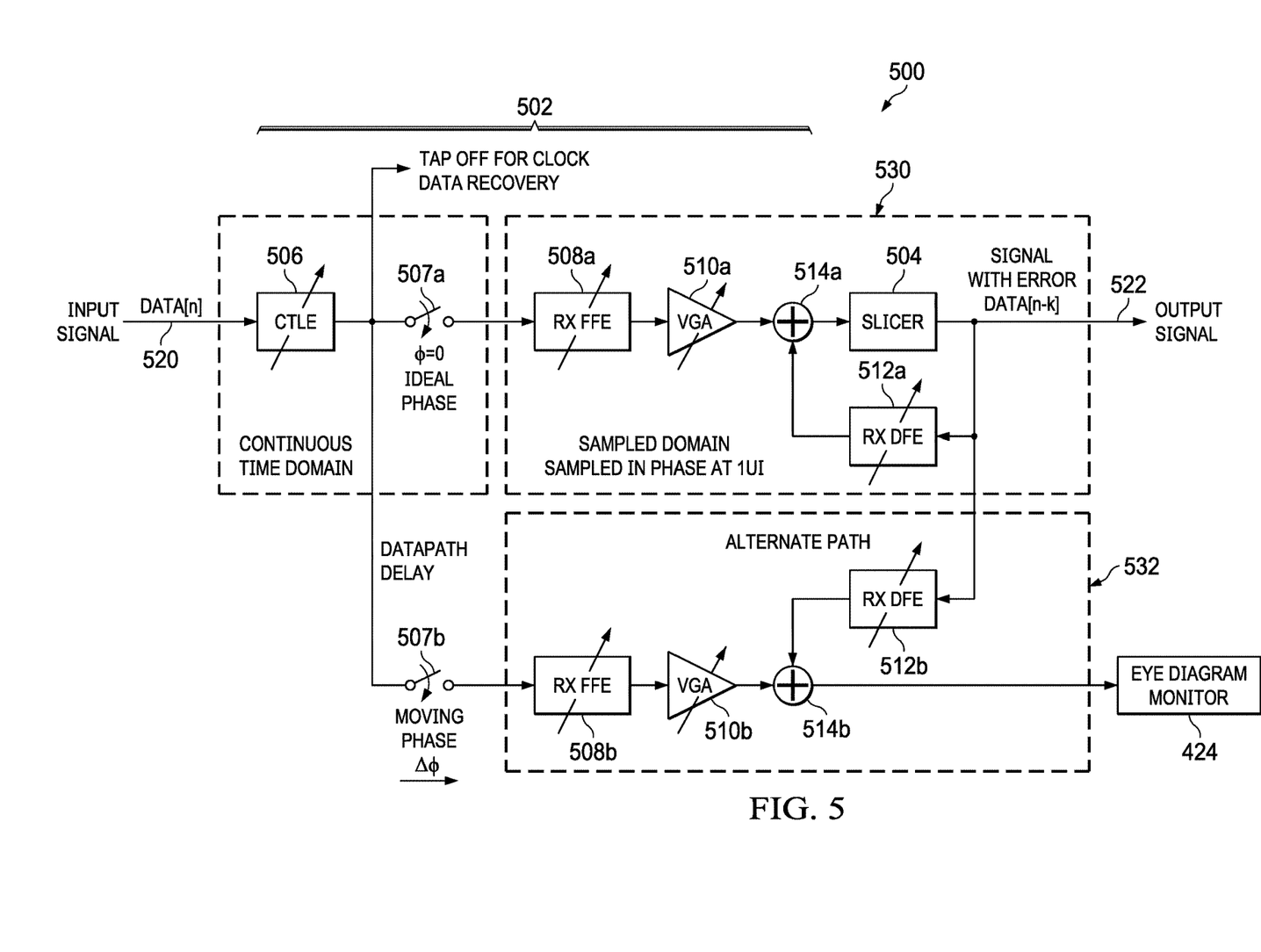
FIG. 5 is a block diagram of an example retimer with an alternate data path, in accordance with an embodiment of the present disclosure.

FIG. 5 is a block diagram of another example retimer 500, in accordance with an embodiment of the present disclosure. The retimer 500 is another example implementation of one or more retimers 206 of FIG. 2. The retimer 500 conditions an input signal 520 for retransmission as an output signal 522 by extracting a clock signal embedded in the input signal 520, recovering data from the input signal 520, and retransmitting a fresh copy of the data using a new clock signal to another retimer or endpoint of the signal transmission system 200. The retimer 500 includes a linear filter 506 (e.g., a continuous time linear equalization or CTLE filter) for extracting the clock from an input signal 520 signal followed by a primary data path 530 and an alternate data path 532 in the sampled domain for extracting the data from the signal. The primary data path 530 and the alternate data path 532 have substantially identical, matched equalization filters. The primary data path 530 includes an analog continuous time domain equalization filter 502 with a low bit error rate (e.g., a BER of about $10^{-12}$) and a slicer 504. The filter 502 includes a continuous time linear equalizer (CTLE) 506, sampling switches 507a and 507b, a receiver feed-forward equalizer (Rx FFE) 508a, a variable gain amplifier (VGA) 510a, a receiver decision-feedback equalizer (Rx DFE) 512a, and a summer 514a. The alternate data path 532 includes a substantially identical Rx FFE 508b, VGA 510b, Rx DFE 512b, and summer 514b. The retimer 500, including the analog continuous time domain equalization filter 502 and the slicer 504 can be implemented in hardware and on the same chip.

The output of the CTLE 506 is sampled prior to the Rx FFE 508a by closing the sampling switches 507a and 507b at each rising or falling edge of the clock recovered from the input signal 520. For example, the clock signal can be embedded with the data in the input signal 520 (such as a self-clocking signal, where binary state changes in the data occur at clocked intervals) or the clock signal can be recovered from a clock signal input provided separately from the input signal 520. The sampling point can be at an ideal phase ($\Phi=0$), as in the primary data path 530, or at a different phase ($\Delta\Phi$), as in the alternate data path 532. In this configuration, the slicer 504 compares the sampled input signal 520 after equalization by the CTLE 506, the Rx FFE 508, and the VGA 510a with a threshold voltage (e.g., $-V_{max}$ or $+V_{max}$ based on the signal transmission protocol, such as a threshold of +1.2 volts or −1.2 volts or as otherwise prescribed by the signal transmission specification). Based on the comparison, the slicer 504 generates a binary output corresponding to data encoded in the input signal 520 at the sampled phase ($\Phi=0$ or $\Delta\Phi$)). If the input signal 520 is above the threshold, the slicer output is a binary "1" (or "0"), and if the input signal 520 is below the threshold, the slicer output is a binary "0" (or "1"). As noted above, the signal transmission system (including the physical medium) may introduce some error into the signal from effects such as noise, signal dispersion, and distortion. To detect such error, the eye diagram monitor 424, such as an oscilloscope, can be used to quantify the error, such as during design, testing, troubleshooting, or otherwise diagnosing system performance.

The primary data path 530 is clocked by the sampling switch 507a at the ideal clock phase $\Phi=0$ (the clock encoded in the input signal 520 offset by zero degrees), which keeps the primary data path 530 intact through the sampled domain (sampled at 1UI of the ideal clock phase $\Phi=0$) for transmission to the next retimer or network endpoint. The alternate data path 532 is clocked by the sampling switch 507b at the moving clock phase $\Delta\Phi$ (the clock encoded in the input signal 520 offset by a delta generated by the eye diagram monitor 424). The slicer output 522 from the primary data path 530 (clocked at the ideal clock phase) is output to a feedback block (Rx DFE) 512b of the alternate data path 532 (clocked at the moving clock phase), thereby avoiding the introduction of errors caused by sampling the data at the moving clock phase, such as discussed above. The eye diagram monitor 424 then taps the output signal 522 after equalization from the alternate data path 532, which as noted above, is sampled at 1UI of the moving clock phase $\Delta\Phi$ to build the eye diagram.

In this example, the on-chip area and power of the equalization are doubled by the two data paths 530, 532. Further, data reaching the alternate data path 532 can potentially be in a different phase as compared to primary data path 530 due to sub-UI latency caused by the paths being in different physical locations and by additional components for controlling the moving clock phase (e.g., different data path delays between the CTLE 506 and each of the Rx FFEs 508a and 508b).

Retimer with Synchronizer for Eye Diagram Monitor

Figure 6:
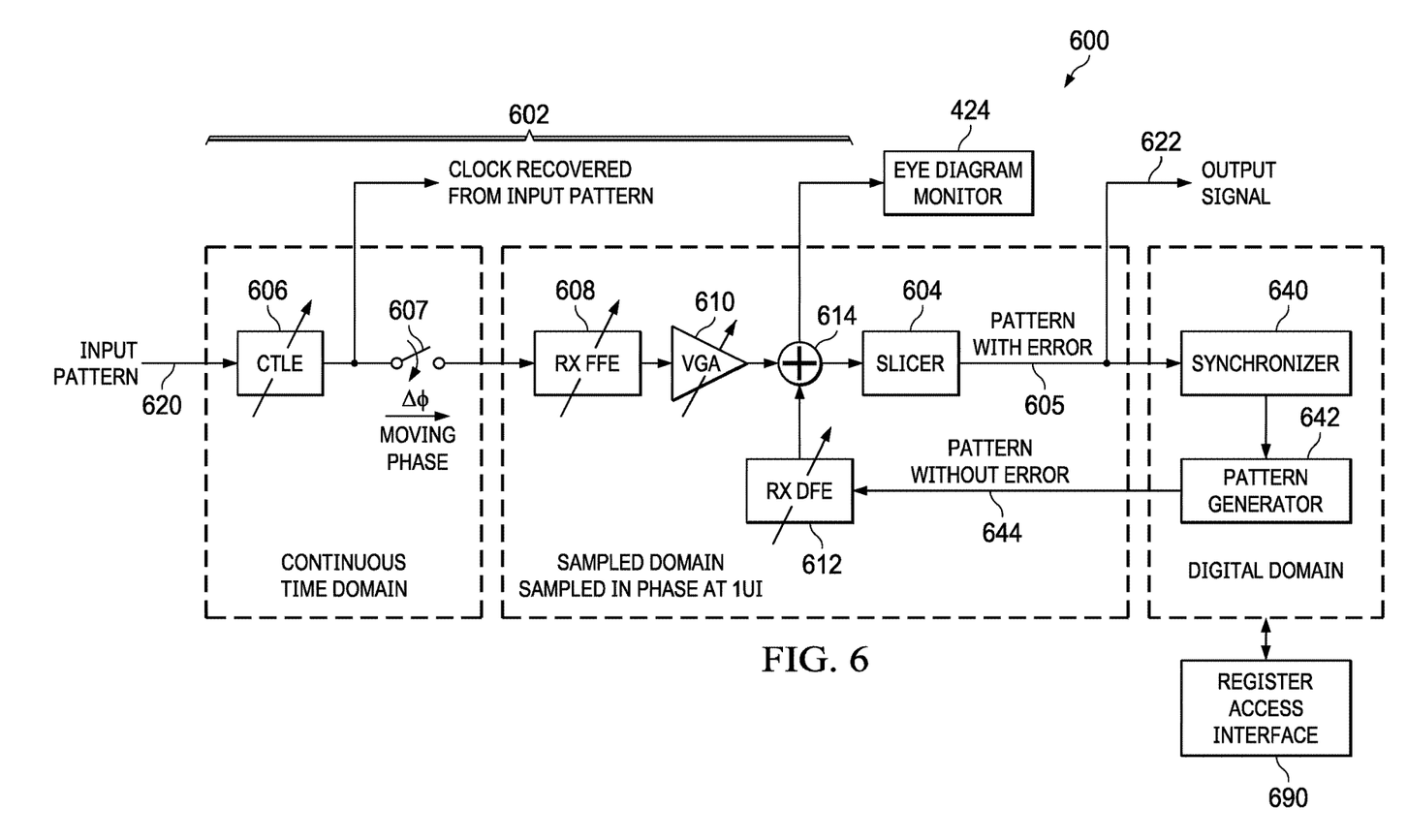
FIG. 6 is a block diagram of an example retimer with a synchronizer, in accordance with an embodiment of the present disclosure.

FIG. 6 is a block diagram of another example retimer 600, in accordance with an embodiment of the present disclosure. The retimer 600 is another example implementation of one or more retimers 206 of FIG. 2. The retimer 600 conditions an input data test pattern 620 for retransmission as an output signal 622 by extracting a clock signal embedded in the input data test pattern 620, recovering data from the input data test pattern 620, and retransmitting a fresh copy of the data using a new clock signal to another retimer or endpoint of the signal transmission system 200. The retimer 600 includes an analog continuous time domain equalization filter 602 with a low bit error rate (e.g., a BER of about $10^{-12}$), a slicer 604, a synchronizer 640, and a pattern generator 642. The filter 602 includes a continuous time linear equalizer (CTLE) 606, a receiver feed-forward equalizer (Rx FFE) 608, a variable gain amplifier (VGA) 610, a sampling switch 607, a receiver decision-feedback equalizer (Rx DFE) 612, and a summer 614.

The retimer 600, including the analog continuous time domain equalization filter 602, the slicer 604, the synchronizer 640, and the pattern generator 642 can be implemented in hardware and on the same chip. The synchronizer 640 and the pattern generator 642 can be selectively enabled and disabled via firmware or internal registers. For example, the synchronizer 640 and the pattern generator 642 can be enabled when the eye diagram monitor 424 is in use during testing operations (e.g., to enable the pattern generator 642 to generate a test pattern without error 644, such as described below), and disabled during normal operations (e.g., to enable the retimer 600 to process the input pattern 620 without using the test pattern 644).

The output of the CTLE 606 is sampled prior to the Rx FFE 608 by closing the sampling switch 607 at each rising or falling edge of the clock recovered from the input data test pattern 620. For example, the clock signal can be embedded with the data in the input data test pattern 620 (such as a self-clocking signal, where binary state changes in the data occur at clocked intervals) or the clock signal can be recovered from a clock signal input provided separately from the input data test pattern 620. In this configuration, the slicer 604 compares the sampled input data test pattern 620 after equalization by the CTLE 606, the Rx FFE 608, and the VGA 610 with a threshold voltage (e.g., $-V_{max}$ or $+V_{max}$ based on the signal transmission protocol, such as a threshold of +1.2 volts or −1.2 volts or as otherwise prescribed by the signal transmission specification). Based on the comparison, the slicer 604 generates a binary output corresponding to data encoded in the input signal 620 at the sampled phase ($\Phi=0$ or $\Delta\Phi$). If the input data test pattern 620 is above the threshold, the slicer output 605 is a binary "1" (or "0"), and if the input data test pattern 620 is below the threshold, the slicer output 605 is a binary "0" (or "1"). As noted above, the signal transmission system (including the physical medium) may introduce some error into the signal from effects such as noise, signal dispersion, and distortion. To detect such error, the eye diagram monitor 424, such as an oscilloscope, can be used to quantify the error, such as during design, testing, troubleshooting, or otherwise diagnosing system performance. The eye diagram monitor 424 taps the sampled signal after equalization for building an eye diagram. The eye diagram monitor 424 samples the signal at an ideal phase where the signal out of the CTLE 606 is centered or nearly centered. The eye diagram monitor 424 further builds the eye diagram by sweeping along two dimensions: voltage and phase. To sweep along one of the dimensions, the eye diagram monitor 424 uses the switch 607 to move the sampling point (e.g., the trigger of the time base or "sweep" of the oscilloscope) away from an ideal phase (e.g., Φ=0 or an average or midpoint of the clock cycle). For example, the eye diagram monitor 424 samples (in the sampled domain) the signal in phase for one unit interval (UI), with each phase step being ΔΦ away from the ideal phase of Φ=0, and also samples the signal in voltage, with each voltage step being ΔV.

As noted above, moving the sampling point away from the ideal phase introduces error in the slicer (binary) output when the equalization filter 602 includes the Rx DFE 612 due to destructive second order effects (e.g., settling errors) and signal transmission delays (e.g., latency caused by physical distances between components on the silicon). However, in some examples, the pattern generator 642 injects a known data test pattern 644 into the feedback signal of the equalization filter 602 when the eye diagram monitor 424 is being used to generate the eye diagram. For example, a register access interface 690 can include a user-selectable test mode that enables the pattern generator 642. The data test pattern 644 is useful, for instance, during design, testing, and maintenance of the signal transmission system. Thus, in some examples, the feedback path from the slicer output 605 to the feedback block (e.g., Rx DFE) is not present. Instead, the pattern generator 642 injects the data test pattern 644 into the Rx DFE 612 with the same sampling clock phase delay as the data output by the slicer 604. The synchronizer 640 computes the sampling clock phase delay used by the pattern generator 642, such as described in further detail below. The input data test pattern 620 is the same as the data test pattern 644 generated by the pattern generator 642, although they are generated independently. The data test pattern 644 entering the Rx DFE 612 is error-free because it is generated independently of the input data test pattern 620 and therefore no errors are introduced into the feedback loop by the slicer 604 or the equalization filter 602.

The sampling clock phase delay of the data test pattern 644 (generated by the pattern generator 642) through the retimer 600 varies due to an inability to know the phase of the input data 620, the data path asynchronous delay/latency through the retimer 600, and the placement of various components on chip, such as the slicer 604 and the Rx DFE 612. To compute the sampling clock phase delay of the data test pattern 644 out of the pattern generator 642, the synchronizer 640 compares the phase of the input data test pattern 620 to the sampled output 605 of the slicer 604 and provides the phase difference to the pattern generator 642. In turn, the pattern generator 642 adjusts the phase of the data test pattern 644 that is then provided to the feedback loop of the equalization filter 602 (via the Rx DFE 612) to substantially match the phase of the input data test pattern 620.

Retimer with Synchronizer and Serializer/De-serializer for Eye Diagram Monitor

Figure 7:
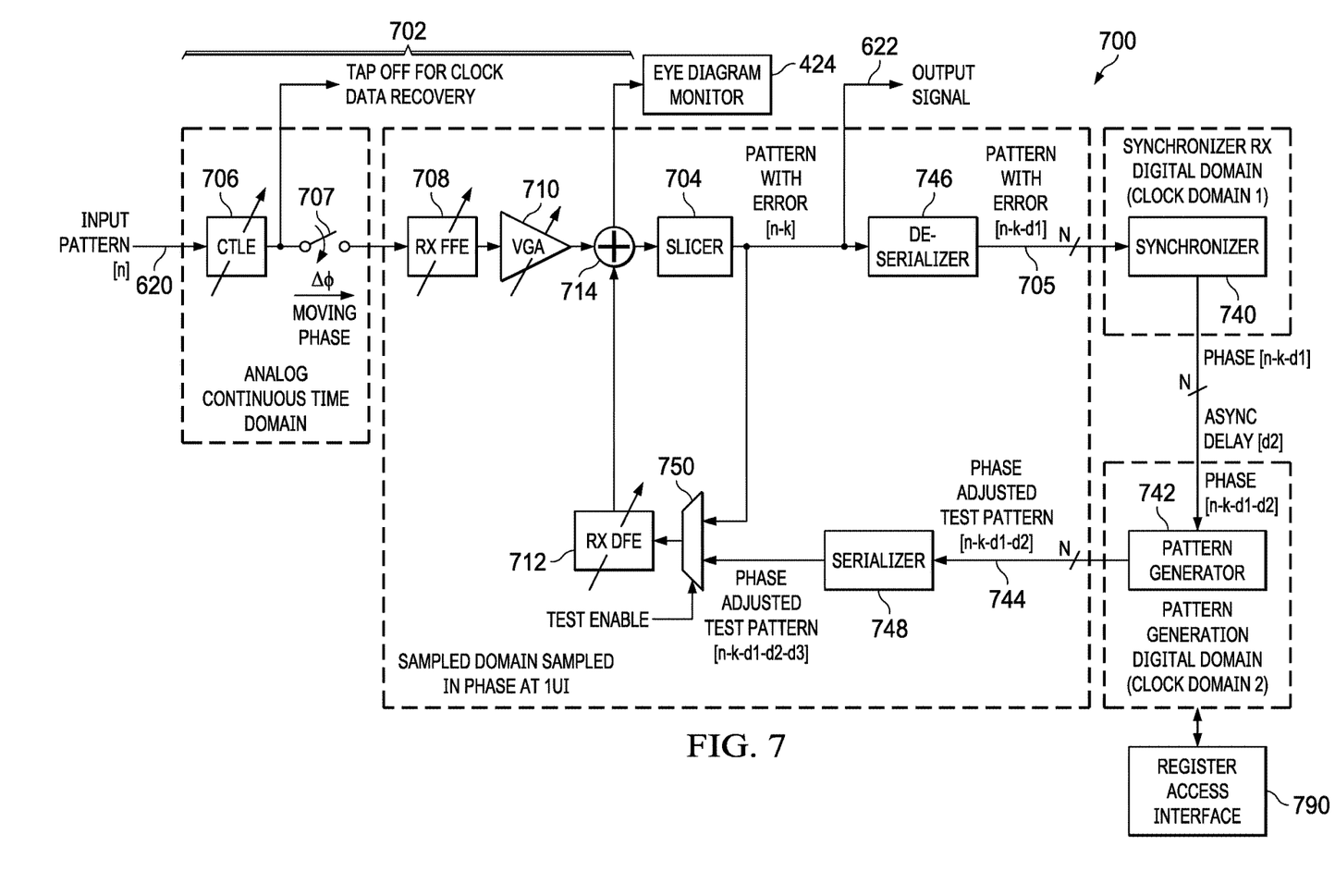
FIG. 7 is a block diagram of an example retimer with a serializer/de-serializer, in accordance with an embodiment of the present disclosure.

FIG. 7 is a block diagram of another example retimer 700, in accordance with an embodiment of the present disclosure. The retimer 700 is another example implementation of one or more retimers 206 of FIG. 2. Similar to the retimer 600 of FIG. 6, the retimer 700 conditions the input data test pattern 620 for retransmission as the output signal 622 by extracting a clock signal embedded in the input data test pattern 620, recovering data from the input data test pattern 620, and retransmitting a fresh copy of the data using a new clock signal to another retimer or endpoint of the signal transmission system 200. The retimer 700 includes an analog continuous time domain equalization filter 702 with a low bit error rate (e.g., a BER of about $10^{-12}$), a slicer 704, a synchronizer 740, a pattern generator 742, a de-serializer 746, and a serializer 748. The filter 702 includes a continuous time linear equalizer (CTLE) 706, a receiver feed-forward equalizer (Rx FFE) 708, a variable gain amplifier (VGA) 710, a sampling switch 707, a receiver decision-feedback equalizer (Rx DFE) 712, and a summer 714.

The retimer 700, including the analog continuous time domain equalization filter 702, the slicer 704, the de-serializer 746, the serializer 748, the synchronizer 740, and the pattern generator 742 can be implemented in hardware and on the same chip. The synchronizer 740 and the pattern generator 742 can be selectively enabled and disabled via firmware or internal registers. For example, the synchronizer 740 and the pattern generator 742 can be enabled when the eye diagram monitor 424 is in use during testing operations (e.g., to enable the pattern generator 742 to generate a test pattern without error 744, such as described below), and disabled during normal operations (e.g., to enable the retimer 700 to process the input pattern 620 without using the test pattern 744).

The output of the CTLE 706 is sampled prior to the Rx FFE 708 by closing the sampling switch 707 at each rising or falling edge of the clock recovered from the input data test pattern 620, such as described above. In this configuration, the slicer 704 compares data from the input data test pattern 620 after equalization with a threshold voltage (e.g., $-V_{max}$ or $+V_{max}$ based on the signal transmission protocol, such as a threshold of +1.2 volts or −1.2 volts or as otherwise prescribed by the signal transmission specification). Based on the comparison, the slicer 704 generates a binary output corresponding to data encoded in the input signal 620, such as discussed above. As noted above, the signal transmission system (including the physical medium) may introduce some error into the signal from effects such as noise, signal dispersion, and distortion. To detect such error, the eye diagram monitor 424, such as an oscilloscope, can be used to quantify the error, such as during design, testing, troubleshooting, or otherwise diagnosing system performance. The eye diagram monitor 424 taps the sampled signal after equalization for building an eye diagram. The eye diagram monitor 424 samples the signal at an ideal phase where the signal out of the CTLE 706 is centered or nearly centered. The eye diagram monitor 424 further builds the eye diagram by sweeping along two dimensions: voltage and phase. To sweep along one of the dimensions, the eye diagram monitor 424 uses the switch 707 to move the sampling point (e.g., the trigger of the time base or "sweep" of the oscilloscope) away from an ideal phase (e.g., Φ=0 or an average or midpoint of the clock cycle). For example, the eye diagram monitor 424 samples (in the sampled domain) the signal in phase for one unit interval (UI), with each phase step being ΔΦ away from the ideal phase of Φ=0, and also samples the signal in voltage, with each voltage step being ΔV.

As noted above, moving the sampling point away from the ideal phase introduces error in the slicer (binary) output when the equalization filter 702 includes the Rx DFE 712 due to destructive second order effects (e.g., settling errors) and signal transmission delays (e.g., latency caused by physical distances between components on the silicon). However, in some examples, the pattern generator 742 injects a known data test pattern 744 into the feedback signal of the equalization filter 702 when the eye diagram monitor 424 is being used to generate the eye diagram. For example, a register access interface 790 in the retimer 700 can include a user-selectable test mode that enables the pattern generator 742. The data test pattern 744 is useful, for instance, during design, testing, and maintenance of the signal transmission system. Thus, in some examples, the feedback path from the slicer output to the feedback block (e.g., Rx DFE) is not connected via multiplexer 750 when the Test Enable signal is logically true. Instead, the pattern generator 742 injects the data test pattern 744 into the Rx DFE 612 with the same sampling clock phase delay as the data output by the slicer 704. The synchronizer 740 computes the sampling clock phase delay used by the pattern generator 742, such as described in further detail below. The input data test pattern 620 is the same as the data test pattern 744, although they are generated independently (for example, the input data test pattern 620 can be generated by one of the network end points 202, 204 or by a device coupled to any of the network end points 202, 204). The data test pattern 744 entering the feedback block is error-free because it is generated independently of the input data test pattern 620 and therefore no errors are introduced into the feedback loop by the slicer 704 or the equalization filter 702. In a normal mode of operation, the Test Enable signal into the multiplexer 750 is logically false, which causes the output of the slicer 704 to feed back to the input of the slicer 704 via the Rx DFE 712, and the data test pattern 744 is not used.

The sampling clock phase delay of the data test pattern 744 (generated by the pattern generator 742) through the retimer 700 varies due to an inability to know the phase of the input data 620, the data path asynchronous delay/latency through the retimer 700, the asynchronous nature of the data serializer 748/de-serializer 746, and the placement of various components on chip, such as the slicer 704 and the Rx DFE 712. To compute the sampling clock phase delay of the data test pattern 744 out of the pattern generator 742, the synchronizer 740 compares the phase of the input data test pattern 620 to the sampled data test pattern 705 output of the slicer 704 and provides the phase difference to the pattern generator 742. In turn, the pattern generator 742 adjusts the phase of the data test pattern 744 that is then provided to the feedback loop of the equalization filter 702 (via the Rx DFE 712) to substantially match the phase of the input data test pattern 620.

Analog signals in high-speed serial links operate at a higher frequency than the digital signals extracted by the slicer 704. To accommodate the difference in frequencies, the retimer 700 includes the de-serializer 746 and the serializer 748. The de-serializer 746 receives the sampled data test pattern from the slicer 704 and parallelizes it for the synchronizer 740. The serializer 748 receives the phase-adjusted data test pattern 744 from the pattern generator 742 and serializes it for feedback into the equalization filter 702. Note that there are several latencies introduced by this configuration. First, the de-serializer 746 and the serializer 748 can have asynchronous phases, which are represented by asynchronous latency delays [d1] and [d3], respectively. For example, the de-serializer 746 and the serializer 748 may start at random asynchronous phases, which add the asynchronous latency delays [d1] and [d3], respectively, to the pattern 705 into the synchronizer 740. These asynchronous delays are random and difficult to quantify without operating the system. However, the delays [d1] and [d3] may be estimated during operation of retimer 700. Second, the slicer 704 and the Rx DFE 712 are physically separated on chip, which introduces a delay [d2] when the signal passes through the synchronizer 740 and pattern generator 742, making it difficult to synchronize the clocks for each of these components. Third, an unknown latency [n−k] may occur between the input 620 to the retimer 700 and the output of the slicer 704, where [k] represents a latency between the input to the CTLE 706 and the output of the slicer 704 for a given data symbol [n]. Furthermore, asynchronous delays are variable and difficult to calculate in advance. For instance, if the corresponding portion of the system restarts, then the delay values may change. Therefore, each of the delays (i.e., a delay [n−k−d4], where [d4]=[d1+d2+d3], or the amount by which the phase-adjusted data test pattern 744 lags the data test pattern 705 from the slicer 704 to the synchronizer 740) may be estimated during runtime without switching off the systems once they are started.

Figure 8:
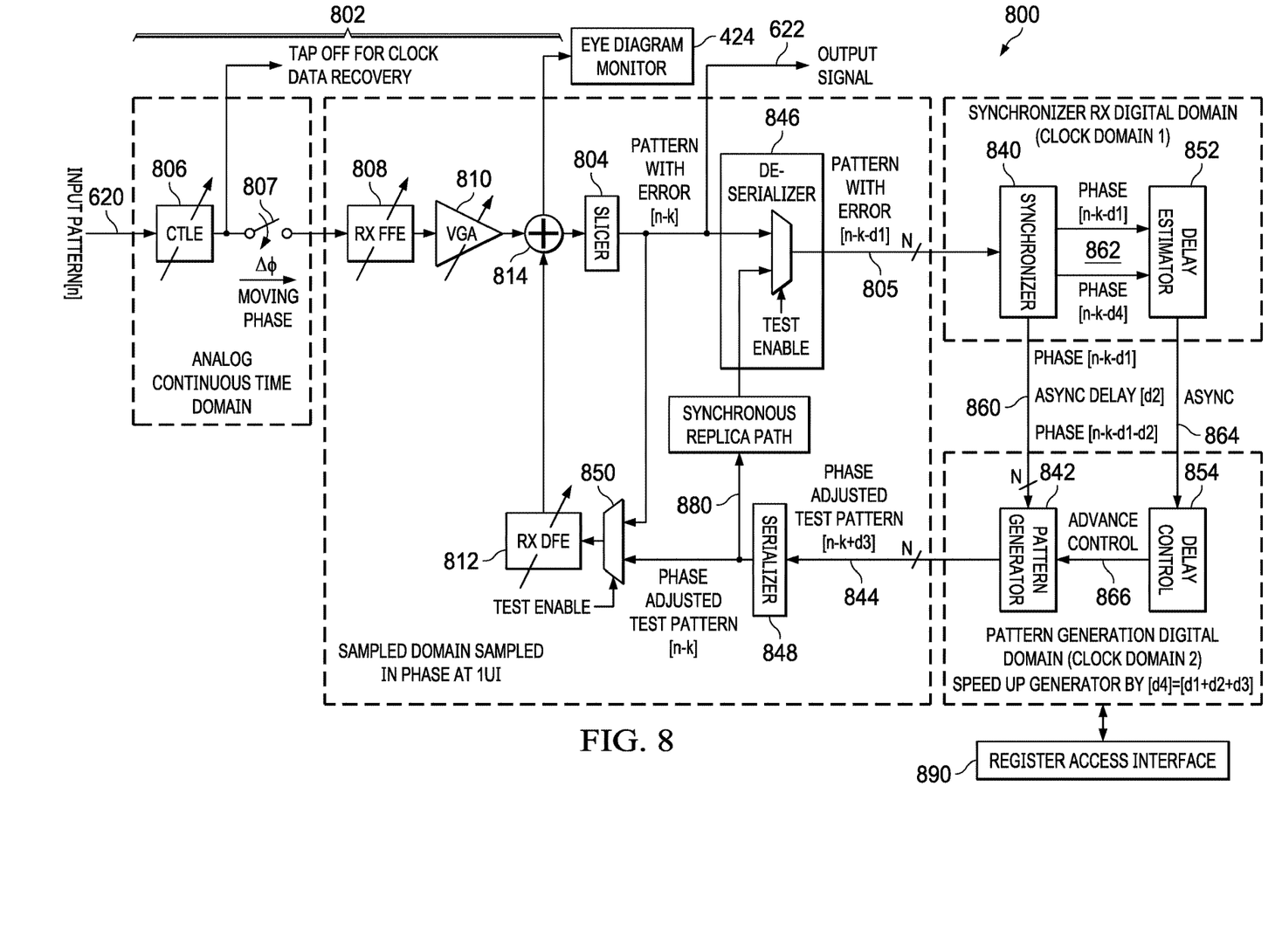
FIG. 8 is a block diagram of an example retimer with a synchronizer and a synchronous replica path, in accordance with an embodiment of the present disclosure.

To estimate the phase of the input data test pattern 620, the synchronizer 740 synchronizes to the input data test pattern 620 and computes a current sample index [n−k−d1]. This is done in a first digital clock domain of the synchronizer 740. The synchronizer 740 computes the phase depending on input pattern type; however, the phase results in a one-to-one mapping between the input and the output. The input sample index [n−k−d1] value is transferred to a second clock domain of the pattern generator 742 asynchronously, which adds the latency [d2]. The pattern generator 742 takes the sample index [n−k−d1−d2] as an input and generates the data test pattern 744, which depends on the type of pattern generation logic being used by the pattern generator 742 (e.g., the same pattern generation logic used by an external device to generate the input pattern 620). However, this configuration may not account for the latency [d3] resulting from passing the data test pattern 744 through the feedback block via the Rx DFE 712. FIG. 8, described below, provides an example retimer 800 which can account for the additional latency [d3].

Retimer with Synchronizer and Synchronous Replica Path for Eye Diagram Monitor

FIG. 8 is a block diagram of another example retimer 800, in accordance with an embodiment of the present disclosure. The retimer 800 is another example implementation of one or more retimers 206 of FIG. 2. The retimer 800 conditions the input data test pattern 620 for retransmission as the output signal 622 by extracting a clock signal embedded in the input data test pattern 620, recovering data from the input data test pattern 620, and retransmitting a fresh copy of the data using a new clock signal to another retimer or endpoint of the signal transmission system 200. The retimer 800 includes an analog continuous time domain equalization filter 802 with a low bit error rate (e.g., a BER of about $10^{-12}$), a slicer 804, a synchronizer 840, a pattern generator 842, a de-serializer 846, a serializer 848, a delay estimator 852, a dynamic delay control 854, and a synchronous replica path 880. The filter 802 includes a continuous time linear equalizer (CTLE) 806, a receiver feed-forward equalizer (Rx FFE) 808, a variable gain amplifier (VGA) 810, a sampling switch 807, a receiver decision-feedback equalizer (Rx DFE) 812, and a summer 814.

The retimer 800, including the analog continuous time domain equalization filter 802, the slicer 804, the synchronizer 840, the pattern generator 842, the delay estimator 852, and the dynamic delay control 854 can be implemented in hardware and on the same chip. The synchronizer 840, the pattern generator 842, the delay estimator 852, and the dynamic delay control 854 can be selectively enabled and disabled via firmware or internal registers, for example, when the eye diagram monitor 424 is in use during testing operations (e.g., to enable the pattern generator 842 to generate a test pattern without error 844, such as described below), and disabled during normal operations (e.g., to enable the retimer 800 to process the input pattern 620 without using the test pattern 844).

The output of the CTLE 806 is sampled prior to the Rx FFE 808 by closing the sampling switch 807 at each rising or falling edge of the clock recovered from an input data test pattern 620, such as described above. In this configuration, the slicer 804 compares data from the input data test pattern 620 after equalization with a threshold voltage (e.g., $-V_{max}$ or $+V_{max}$ based on the signal transmission protocol, such as a threshold of +1.2 volts or −1.2 volts or as otherwise prescribed by the signal transmission specification). Based on the comparison, the slicer 804 generates a binary output corresponding to data encoded in the input signal 620, such as discussed above. As noted above, the signal transmission system (including the physical medium) may introduce some error into the signal from effects such as noise, signal dispersion, and distortion. To detect such error, an eye diagram monitor 424, such as an oscilloscope, can be used to quantify the error, such as during design, testing, troubleshooting, or otherwise diagnosing system performance. The eye diagram monitor 424 taps the sampled signal after equalization for building an eye diagram. The eye diagram monitor 424 samples the signal at an ideal time point where the signal out of the CTLE 806 is centered. The eye diagram monitor 424 further builds the eye diagram by sweeping along two dimensions: voltage and phase. To sweep along one of the dimensions, the eye diagram monitor 424 uses the switch 807 to move the sampling point (e.g., the trigger of the time base or "sweep" of the oscilloscope) away from an ideal phase (e.g., $\Phi=0$ or an average or midpoint of the clock cycle). For example, the eye diagram monitor 424 samples (in the sampled domain) the signal in phase for one unit interval (UI), with each phase step being $\Delta\Phi$ away from the ideal phase of $\Phi=0$, and also samples the signal in voltage, with each voltage step being $\Delta V$.

As noted above, moving the sampling point away from the ideal phase introduces error in the slicer (binary) output when the equalization filter 802 includes the Rx DFE 812 due to destructive second order effects (e.g., settling errors) and signal transmission delays (e.g., latency caused by physical distances between components on the silicon). However, in some examples, the pattern generator 842 injects a known data test pattern 844 into the feedback signal of the equalization filter 802 when the eye diagram monitor 424 is being used to generate the eye diagram. For example, a register access interface 890 in the retimer 800 can include a user-selectable test mode that enables the pattern generator 842. The data test pattern 844 is useful, for instance, during design, testing, and maintenance of the signal transmission system. Thus, in some examples, the feedback path from the slicer output to the feedback block (e.g., Rx DFE) is not connected via multiplexer 850 when the Test Enable signal is logically true. Instead, the pattern generator 842 injects the data test pattern 844 into the Rx DFE 812 with the same sampling clock phase delay as the data output by the slicer 804. The synchronizer 840 computes the sampling clock phase delay used by the pattern generator 842, such as described in further detail below. The input data test pattern 620 is the same as the data test pattern 844, although they are generated independently. The data test pattern 844 entering the feedback block is error-free because it is generated independently of the input test pattern 620 and therefore no errors are introduced into the feedback loop by the slicer 804 or the equalization filter 802. In a normal mode of operation, the Test Enable signal into the multiplexer of the de-serializer 846 and the multiplexer 850 coupled to the Rx DFE 812 is logically false, which causes the output of the slicer 804 to feed back to the input of the slicer 804 via the Rx DFE 812 and to pass through to the synchronizer 840, and the data test pattern 844 is not used.

As discussed above, the sampling clock phase delay of the data test pattern 844 (generated by the pattern generator 842) through the retimer 800 varies due to factors such as the placement of various components on chip, such as the slicer 804 and the Rx DFE 812. To compute the sampling clock phase delay of the data test pattern 844 out of the pattern generator 842, the synchronizer 840 compares the phase of the input data test pattern 620 to the sampled data test pattern 805 output of the slicer 804 and provides the phase difference to the pattern generator 842. In turn, the pattern generator 842 adjusts the phase of the data test pattern 844 that is then provided to the feedback loop of the equalization filter 802 (via the Rx DFE 812) to substantially match the phase of the input data test pattern 620.

As noted above, analog signals in high-speed serial links operate at a higher frequency than the digital signals extracted by the slicer 804. To accommodate the difference in frequencies, the retimer 800 includes the de-serializer 846 and the serializer 848. The de-serializer 846 receives the sampled data test pattern from the slicer 804 and parallelizes it for the synchronizer 840. The serializer 848 receives the phase-adjusted data test pattern 844 from the pattern generator 842 and serializes it for feedback into the equalization filter 802. Note that there are several latencies introduced by this configuration. First, the de-serializer 846 and the serializer 848 can have asynchronous phases, which are represented by asynchronous latency delays [d1] and [d3], respectively. For example, as discussed above, the de-serializer 846 and the serializer 748 may start at random asynchronous phases, which add the asynchronous latency delays [d1] and [d3], respectively, to the pattern 805 into the synchronizer 840. Second, the slicer 804 and the Rx DFE 812 are physically separated on chip, which introduces a delay [d2], making it difficult to synchronize the clocks for each of these components. Third, there is an unknown latency [n−k] between the input 620 to the retimer 800 and the output of the slicer 804. Furthermore, asynchronous delays are variable and not possible to calculate in advance. For instance, if the corresponding portion of the system restarts, then the delay values will change. Therefore, each of the delays (i.e., a delay [n−k−d4], where [d4]=[d1+d2+d3], or the amount by which the phase-adjusted data test pattern 844 lags the data test pattern 805 from the slicer 804 to the synchronizer 840) may be estimated during runtime without switching off the systems once they are started.

To estimate the phase of the input data test pattern 620, the synchronizer 840 synchronizes to the input data test pattern 620 and computes a current sample index [n−k−d1]. This is done in a first digital clock domain of the synchronizer 840. The synchronizer 840 computes the phase depending on input pattern type; however, the phase results in a one-to-one mapping between the input and the output. The input sample index pattern [n−k−d1] value is transferred to a second clock domain of the pattern generator 842 via asynchronous signal 860. The signal 760 adds a latency [d2] to the phase [n−k−d1] of the pattern output from the synchronizer 840 to the pattern generator 842. The pattern generator 842 takes the signal 860 as an input and generates the data test pattern 844, which depends on the type of pattern generation logic being used by the pattern generator 842 (e.g., the same pattern generation logic used by an external device to generate the input pattern 620).

To account for the latency [d3] resulting from passing the data test pattern 844 through the feedback block via the Rx DFE 812, the retimer 800 further includes the synchronous replica path 880 with the same clock delay as between the Rx DFE 812 and the slicer 804. The synchronous replica path 880 sends data 844 from the pattern generator 842 to the synchronizer 840 via de-serializer 846 when the Test Enable signal is logically true at the multiplexer of the de-serializer 846. This provides a synchronous path between all components having asynchronous delays (e.g., the de-serializer 846 and the serializer 848) and enables the synchronizer 840 to estimate those delays. For example, to estimate the phase of the data output 805 by the slicer 804, the synchronizer 840 synchronizes the output 805 with the data test pattern 844 and computes a current sample index [n–k–d4], which is provided to the delay estimator 852 via path 862 along with the input sample index pattern [n–k–d1]. The delay estimator 852 computes the delay [d4] between the input data test pattern 620 and the data test pattern 844 by comparing the phase of the data received by the synchronizer 840 from the slicer 804 (the sample phase) to the phase of the data test pattern 844. Essentially, [d4] is equal to the sum of delays [d1], [d2] and [d3]. The delay estimator 852 provides an asynchronous signal 864 representing the delay [d4] to the dynamic delay control 854. The dynamic delay control 854 advances or delays the pattern generator 842 via signal 866 such that the data test pattern 844 is adjusted by the delay value [d4] to match the delay of the data test pattern 844 sampled at the slicer 804. This causes the pattern generator 842 output 844 to have a delay of [n–k]+[d3], which compensates for the delay [d3] introduced by the serializer 848 downstream of the pattern generator 842 as well as for the delays [d1] and [d2] introduced upstream of the pattern generator 842. The data test pattern 844, when sent through the serializer 848, will accordingly have a sample index [n–k+d3–d3], or [n–k], at the input of Rx DFE 812. Because the data test pattern 844 is generated on the same chip, the handoff from the pattern generator 842 and the Rx DFE 812 is stable, thereby avoiding any second order settling effects in the slicer 804 that are induced by the Rx DFE 812.

Example Method for Transmitting a Signal

Figure 9:
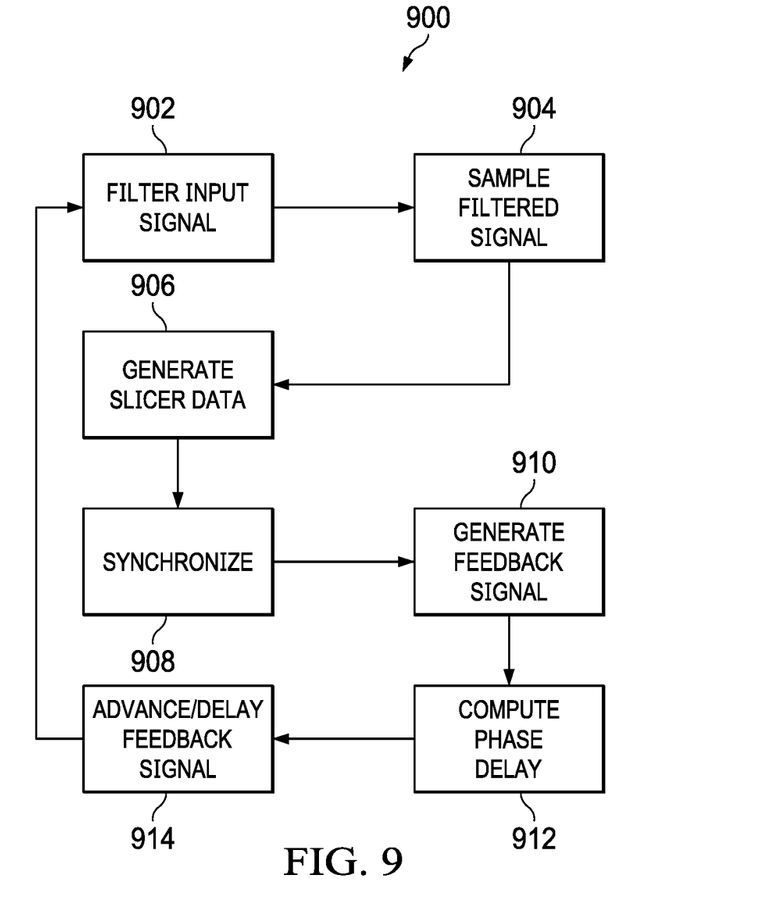
FIG. 9 is a flow diagram of an example method for transmitting a signal, in accordance with an embodiment of the present disclosure.

FIG. 9 is a flow diagram of an example method 900 for transmitting a signal, using (for example) a retimer 206, 600, 700 and/or 800, in accordance with an embodiment of the present disclosure. The method 900 includes filtering 902 an input signal based at least in part on a feedback signal. For example, an equalization filter, such as the filters 602, 702, and/or 802, can be used to filter the input signal in a continuous time domain. The method 900 further includes sampling 904 the filtered signal at a plurality of different phases. For example, the filtered signal can be sampled at an ideal phase (e.g., Φ=0 or an average or midpoint of the clock cycle) and at one or more different phases (e.g., ΔΦ away from the ideal phase of Φ=0). The method 900 further includes generating 906 data based on the sampled input signal (e.g., data in the analog input signal). For example, a slicer, such as the slicers 604, 704, and/or 804, can be used to compare the input signal after equalization with a threshold voltage (e.g., $-V_{max}$ or $+V_{max}$) and to generate a binary output based on the comparison. If the signal is above the threshold, the slicer output is a binary 1 (or 0), and if the signal is below the threshold, the slicer output is a binary 0 (or 1). The method 900 further includes synchronizing 908 the data to an internally generated feedback signal (e.g., a test pattern matched to the data pattern in the input signal). The method 900 further includes generating 910 the feedback signal and computing 912 a phase delay between the input signal and the sampled signal. For example, a synchronizer, such as the synchronizers 640, 740, and/or 840, and the dynamic delay estimator 852 can be used to compute the phase delay between the data pattern of the input signal to the retimer and the data output by the slicer. The method 900 further includes generating 914 the feedback signal at a phase adjusted (advanced or delayed) by the phase delay (e.g., using the dynamic delay control 854).

The terms "circuit" or "circuitry," as used in any embodiment herein, is a functional apparatus and may comprise, for example, singly or in any combination, hardwired circuitry, programmable circuitry such as one or more computer processors comprising one or more individual instruction processing cores, state machine circuitry, and/or firmware that stores instructions executed by programmable circuitry. The circuitry may include a processor and/or controller configured to execute one or more instructions to perform one or more operations described herein. The instructions may be embodied as, for example, an application, software, firmware, etc. configured to cause the circuitry to perform any of the aforementioned operations. Software may be embodied as a software package, code, instructions, instruction sets and/or data recorded on a computer-readable storage device. Software may be embodied or implemented to include any number of processes, and processes, in turn, may be embodied or implemented to include any number of threads, etc., in a hierarchical fashion. Firmware may be embodied as code, instructions or instruction sets and/or data that are hard-coded (e.g., nonvolatile) in memory devices. The circuitry may, collectively or individually, be embodied as circuitry that forms part of a larger system, for example, an integrated circuit (IC), an application-specific integrated circuit (ASIC), a system on-chip (SoC), desktop computers, laptop computers, tablet computers, servers, smart phones, etc. Other embodiments may be implemented as software stored in a machine-readable medium and that can be executed by a programmable control device. As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Thus, a circuit or circuitry is a functional physical apparatus that can be any of integrated circuitry, printed circuit board circuitry, gate-level logic, analog and/or digital circuitry, one or more programmed processors or processing entities (e.g., combination of instructions and one or more processors configured to execute those instructions).

The term "couple" is used throughout the specification. The term may cover connections, communications, or signal paths that enable a functional relationship consistent with this description. For example, if device A provides a signal to control device B to perform an action, in a first example device A is coupled to device B, or in a second example device A is coupled to device B through intervening component C if intervening component C does not substantially alter the functional relationship between device A and device B such that device B is controlled by device A via the control signal provided by device A.

A device that is "configured to" perform a task or function may be configured (e.g., programmed and/or hardwired) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof.

As used herein, the terms "terminal", "node", "interconnection", "pin" and "lead" are used interchangeably. Unless specifically stated to the contrary, these terms are generally used to mean an interconnection between or a terminus of a device element, a circuit element, an integrated circuit, a device or other electronic or semiconductor component.

While some example embodiments suggest that certain elements are included in an integrated circuit while other elements are external to the integrated circuit, in other example embodiments, additional or fewer features may be incorporated into the integrated circuit. In addition, some or all of the features illustrated as being external to the integrated circuit may be included in the integrated circuit and/or some features illustrated as being internal to the integrated circuit may be incorporated outside of the integrated. As used herein, the term "integrated circuit" means one or more circuits that are: (i) incorporated in/over a semiconductor substrate; (ii) incorporated in a single semiconductor package; (iii) incorporated into the same module; and/or (iv) incorporated in/on the same printed circuit board.

Unless otherwise stated, "about," "approximately," or "substantially" preceding a value means +/−10 percent of the stated value. Modifications are possible in the described examples, and other examples are possible within the scope of the claims.

Further Example Embodiments

The following examples pertain to further embodiments, from which numerous permutations and configurations will be apparent.

Example 1 is a signal transmission system including an equalization filter configured to filter an input signal based at least in part on a feedback signal, a slicer coupled to the equalization filter and configured to compare the filtered input signal sampled at a plurality of different phases, with a threshold and to generate a binary output per unit sample, a synchronizer coupled to the slicer and configured to compute a phase delay between the input signal at each of the different phases and the binary output for each of the unit samples, and a pattern generator coupled to the synchronizer and configured to generate the feedback signal at a phase adjusted by the phase delay.

Example 2 includes the subject matter of Example 1, where the equalization filter includes one or more of: a continuous time linear equalizer (CTLE), a receiver feed-forward equalizer (Rx FFE) coupled to an output of the CTLE, a variable gain amplifier (VGA) coupled to an output of the Rx FFE, a receiver decision-feedback equalizer (Rx DFE) coupled to an output of the slicer, and a summer coupled to an output of the VGA and an output of the Rx DFE.

Example 3 includes the subject matter of any one of Examples 1 and 2, further including an eye diagram monitor coupled to the equalization filter and configured to generate an eye diagram based on the filtered signal clocked at the plurality of different phases.

Example 4 includes the subject matter of any one of Examples 1-3, further including a de-serializer coupled to the slicer and configured to parallelize the sampled signal and a serializer coupled to the equalization filter and configured to serialize the feedback signal.

Example 5 includes the subject matter of Example 4, further including a synchronous replica path coupled between the serializer and the de-serializer.

Example 6 includes the subject matter of any of Examples 1-6, further including a delay estimator coupled to the synchronizer and configured to compute a synchronizer delay between the binary output of the slicer and an input of the synchronizer.

Example 7 includes the subject matter of Example 6, further including a dynamic delay control coupled to the pattern generator and configured to advance or delay the pattern generator such that the feedback signal is adjusted by the synchronizer delay.

Example 8 is a signal transmission circuit including an input and an output; an equalization circuit coupled to the input and configured to filter an input signal based at least in part on a feedback signal, a slicer circuit coupled to the equalization circuit and the output, the slicer circuit configured to generate data based on the filtered signal sampled at a plurality of different phases, a synchronizer circuit coupled to the slicer circuit and configured to compute a phase delay between the data and the input signal at each of the different phases, and a pattern generator circuit coupled to the synchronizer circuit and configured to generate the feedback signal at a phase adjusted by the phase delay, the input signal and the feedback signal each representing a data test pattern.

Example 9 includes the subject matter of Example 8, where the equalization circuit includes one or more of: a continuous time linear equalizer (CTLE) circuit coupled to the input signal, a receiver feed-forward equalizer (Rx FFE) circuit coupled to an output of the CTLE circuit, a variable gain amplifier (VGA) circuit coupled to an output of the Rx FFE circuit, a receiver decision-feedback equalizer (Rx DFE) circuit coupled to an output of the slicer, and a summer circuit coupled to an output of the VGA circuit and an output of the Rx DFE circuit, where the slicer circuit is coupled to the summer circuit.

Example 10 includes the subject matter of any one of Examples 8 and 9, further including an eye diagram monitor coupled to the equalization circuit and configured to generate an eye diagram based on the filtered signal clocked at the plurality of different phases.

Example 11 includes the subject matter of any one of Examples 8–10, further including a de-serializer circuit coupled to the slicer circuit and configured to parallelize the sampled signal, and a serializer circuit coupled to the Rx DFE circuit and configured to serialize the feedback signal.

Example 12 includes the subject matter of Example 11, further including a synchronous replica path between the serializer circuit and the de-serializer circuit.

Example 13 includes the subject matter of any one of Examples 8–12, further including a delay estimator circuit configured to compute a synchronizer delay between the binary output of the slicer circuit and an input of the synchronizer circuit.

Example 14 includes the subject matter of Example 13, further including a dynamic delay control circuit configured to advance or delay the pattern generator circuit such that the feedback signal is adjusted by the synchronizer delay.

Example 15 is a method for transmitting a signal. The method includes filtering an input signal based at least in part on a feedback signal, sampling the filtered input signal at a plurality of different phases, generating data based on the sampled input signal; computing a phase delay between the input signal and the data at each of the different phases, and generating the feedback signal at a phase adjusted by the phase delay.

Example 16 includes the subject matter of Example 15, further including generating an eye diagram based on the filtered signal clocked at the plurality of different phases.

Example 17 includes the subject matter of any of Examples 15 and 16, further including synchronizing the data to the feedback signal.

Example 18 includes the subject matter of any one of Examples 15-17, further including parallelizing the sampled signal, and serializing the feedback signal.

Example 19 includes the subject matter of Example 18, where the phase delay is a first phase delay, where the method further includes computing a second phase delay between the input signal and the sampled signal, and where the first and second phase delays are different.

Example 20 includes the subject matter of Example 19, where the feedback signal is further adjusted by the second delay.

The foregoing description of example embodiments of the disclosure has been presented for the purposes of illustration and description. It is not intended to be exhaustive or to limit the disclosure to the precise forms disclosed. Many modifications and variations are possible in light of this disclosure. It is intended that the scope of the disclosure be limited not by this detailed description, but rather by the claims appended hereto.

The invention claimed is:

1. A signal transmission system comprising:
an equalization filter configured to filter an input signal based at least in part on a feedback signal;
a slicer coupled to the equalization filter and configured to compare the filtered input signal sampled at a plurality of different phases with a threshold and to generate a binary output per unit sample;
a synchronizer coupled to the slicer and configured to compute a phase delay between the input signal at each of the different phases and the binary output for each of the unit samples;
a pattern generator coupled to the synchronizer and configured to generate the feedback signal at a phase adjusted by the phase delay;
a de-serializer coupled to the slicer and configured to parallelize the sampled signal;
a serializer coupled to the equalization filter and configured to serialize the feedback signal; and
a synchronous replica path coupled between the serializer and the de-serializer.

2. The signal transmission system of claim 1, wherein the equalization filter includes one or more of:
a continuous time linear equalizer (CTLE);
a receiver feed-forward equalizer (Rx FFE) coupled to an output of the CTLE;
a variable gain amplifier (VGA) coupled to an output of the Rx FFE;
a receiver decision-feedback equalizer (Rx DFE) coupled to an output of the slicer; and
a summer coupled to an output of the VGA and an output of the Rx DFE.

3. The signal transmission system of claim 1, further comprising an eye diagram monitor coupled to the equalization filter and configured to generate an eye diagram based on the filtered signal clocked at the plurality of different phases.

4. A signal transmission system comprising:
an equalization filter configured to filter an input signal based at least in part on a feedback signal;
a slicer coupled to the equalization filter and configured to compare the filtered input signal sampled at a plurality of different phases with a threshold and to generate a binary output per unit sample;
a synchronizer coupled to the slicer and configured to compute a phase delay between the input signal at each of the different phases and the binary output for each of the unit samples;
a pattern generator coupled to the synchronizer and configured to generate the feedback signal at a phase adjusted by the phase delay; and
a delay estimator coupled to the synchronizer and configured to compute a synchronizer delay between the binary output of the slicer and an input of the synchronizer.

5. The signal transmission system of claim 4, further comprising a dynamic delay control coupled to the pattern generator and configured to advance or delay the pattern generator such that the feedback signal is adjusted by the synchronizer delay.

6. A signal transmission circuit comprising:
an equalization circuit configured to filter an input signal based at least in part on a feedback signal;
a slicer circuit coupled to the equalization circuit, the slicer circuit configured to generate data based on the filtered input signal sampled at a plurality of different phases;
a synchronizer circuit coupled to the slicer circuit and configured to compute a phase delay between the data and the input signal at each of the different phases;
a pattern generator circuit coupled to the synchronizer circuit and configured to generate the feedback signal at a phase adjusted by the phase delay, the input signal and the feedback signal each representing a data test pattern;
a de-serializer circuit coupled to the slicer circuit and configured to parallelize the sampled signal;
a serializer circuit coupled to the equalization circuit and configured to serialize the feedback signal; and
a synchronous replica path between the serializer circuit and the de-serializer circuit.

7. The signal transmission circuit of claim 6, wherein the equalization circuit includes one or more of:
a continuous time linear equalizer (CTLE) circuit coupled to the input signal;
a receiver feed-forward equalizer (Rx FFE) circuit coupled to an output of the CTLE circuit;
a variable gain amplifier (VGA) circuit coupled to an output of the Rx FFE circuit;
a receiver decision-feedback equalizer (Rx DFE) circuit coupled to an output of the slicer; and
a summer circuit coupled to an output of the VGA circuit and an output of the Rx DFE circuit,
wherein the slicer circuit is coupled to the summer circuit.

8. The signal transmission circuit of claim 6, further comprising an eye diagram monitor coupled to the equalization circuit and configured to generate an eye diagram based on the filtered signal clocked at the plurality of different phases.

9. A signal transmission circuit comprising:
an equalization circuit configured to filter an input signal based at least in part on a feedback signal;
a slicer circuit having a binary output, the slicer circuit coupled to the equalization circuit, the slicer circuit configured to generate data based on the filtered input signal sampled at a plurality of different phases;

a synchronizer circuit having an input, the equalizer circuit coupled to the slicer circuit and configured to compute a phase delay between the data and the input signal at each of the different phases;

a pattern generator circuit coupled to the synchronizer circuit and configured to generate the feedback signal at a phase adjusted by the phase delay, the input signal and the feedback signal each representing a data test pattern; and a delay estimator circuit configured to compute a synchronizer delay between the binary output of the slicer circuit and the input of the synchronizer circuit.

10. The signal transmission circuit of claim 9, further comprising a dynamic delay control circuit configured to advance or delay the pattern generator circuit such that the feedback signal is adjusted by the synchronizer delay.

11. A method for transmitting a signal, the method comprising:

filtering an input signal based at least in part on a feedback signal;

sampling the filtered input signal at a plurality of different phases;

generating data based on the sampled input signal;

computing a first phase delay between the input signal and the data at each of the different phases;

generating the feedback signal at a phase adjusted by the first phase delay;

parallelizing the sampled signal;

serializing the feedback signal; and computing a second phase delay between the input signal and the sampled signal, wherein the first and second phase delays are different.

12. The method of claim 11, further comprising generating an eye diagram based on the filtered signal clocked at the plurality of different phases.

13. The method of claim 12, further comprising synchronizing the data to the feedback signal.

14. The method of claim 11, wherein the feedback signal is further adjusted by the second phase delay.

* * * * *